Dec. 27, 1949     H. A. SUTTON ET AL     2,492,245
AIRCRAFT CONTROL MEANS

Filed July 25, 1945                     2 Sheets-Sheet 1

H. A. Sutton INVENTOR.
and Rolf Evers
BY
James M. Clark
Their Patent Attorney

Dec. 27, 1949     H. A. SUTTON ET AL     2,492,245
AIRCRAFT CONTROL MEANS
Filed July 25, 1945     2 Sheets-Sheet 2
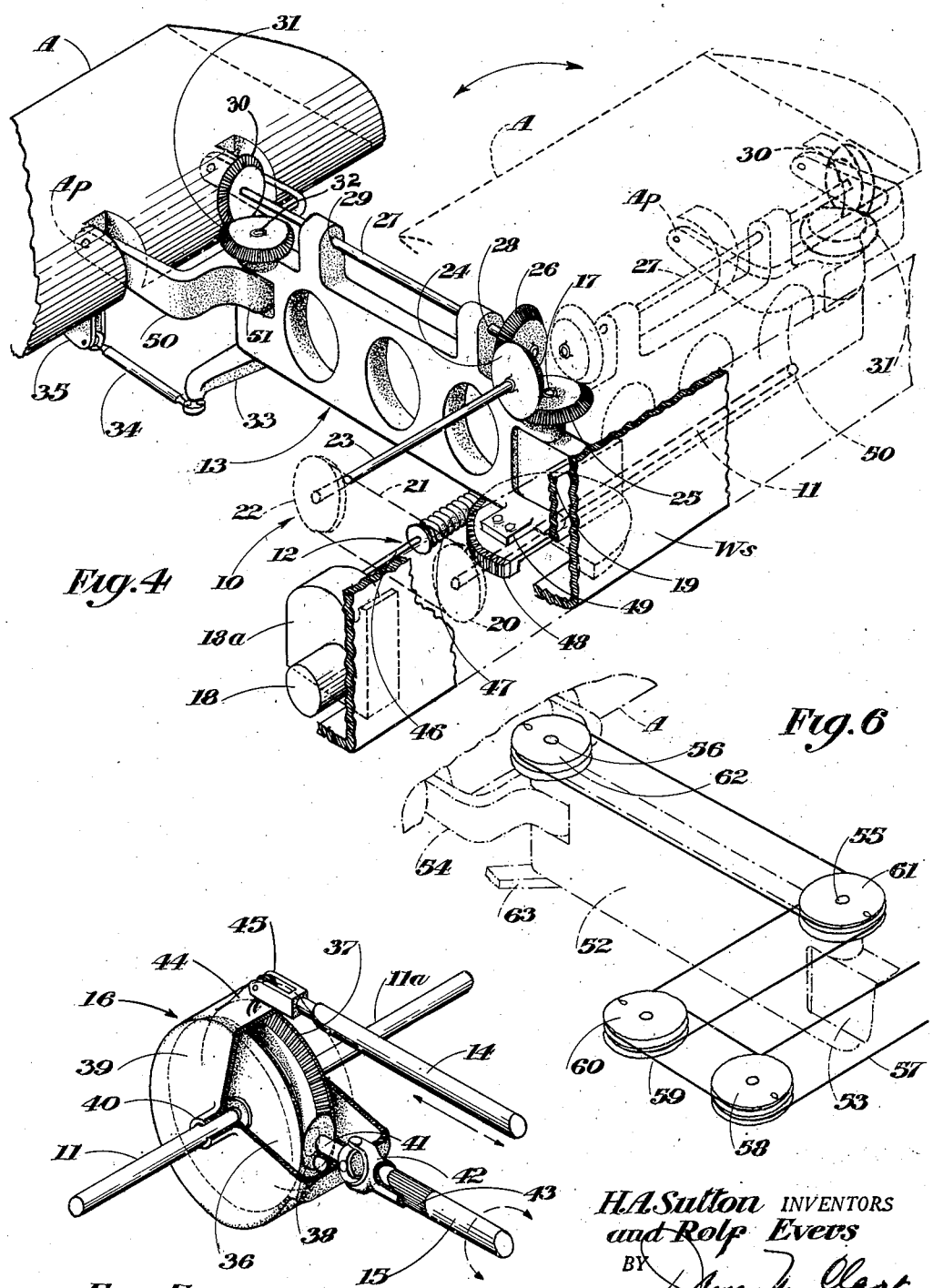
H. A. Sutton and Rolf Evers INVENTORS
BY James M. Clark
Their Patent Attorney Patented Dec. 27, 1949

2,492,245

UNITED STATES PATENT OFFICE 2,492,245

AIRCRAFT CONTROL MEANS

Harry A. Sutton, Baltimore, Md., and Rolf Evers, Coronado, Calif., assignors to Consolidated Vultee Aircraft Corporation, a corporation of Delaware Application July 25, 1945, Serial No. 606,914

3 Claims. (Cl. 244—13)

The present invention relates to the control of aircraft and like vehicles, and is more particularly directed to extensible control surfaces adapted for both longitudinal and lateral control.

The use of high lift flaps for take-off and landing purposes has produced decided aerodynamic advantages, particularly in the operation of large aircraft. The use of certain types of such flaps, however, presents a number of problems particularly from their inherent disadvantage of causing a relatively large rearward shift in the center of lift of the wing when the flap is extended rearwardly. In aircraft of the conventional type having rearwardly disposed horizontal tail surfaces, this disturbance in the location of the center of lift is readily accommodated by producing a negative lift or downward force by the horizontal tail surfaces. In the conventional empennage type airplane the flaps usually produce a down-wash effect which, acting upon the stabilizer tends to counterbalance the diving moment and thereby produce a stable condition. This negative lift in the tail surfaces, however, adds to the load, or to the lift to be developed by the main sustaining surface, and to this extent it has been found objectionable and to detract from the aerodynamic efficiency and loading characteristics of the airplane.

Attempts have been made in the prior art to overcome these disadvantages by the provision of auxiliary lifting surfaces located forwardly with respect to the center of gravity of the airplane or the center of pressure of the wing, in order that this auxiliary lift assist the lift of the main sustaining surface, rather than to add unduly to its load.

In tail-less, or flying wing, types of aircraft, the use of certain type flaps have presented problems which are not readily solved as by taking advantage of the use of a conventional tail surface, and the fuselage projection forward of the wing's leading edge in tail-less models is not always such as to support a forwardly disposed auxiliary lifting surface. Several efforts have been made in tail-less type airplanes to provide suitable means for balancing the diving moments created by the use of these high lift flaps, but such prior efforts have either been relatively unsuccessful, have resulted in materially complicating the design of the control system or have been found objectionable for other reasons.

The present invention relates to an improved control means for providing a balancing force to counteract the diving moment produced in airplanes provided with flaps and is particularly adapted to the balancing of these diving moments, and the provision of longitudinal control and stability in tail-less or flying-wing types of aircraft. The improved surface comprising the present invention consists essentially of a rearwardly and outwardly extensible control surface which is operable in both its retracted and extended, as well as all of its intermediate, positions—both differentially or simultaneously opposite for use as an aileron in providing lateral control, and simultaneously in the same direction, either upwardly or downwardly, for use as an elevator to obtain longitudinal control. The invention further consists in novel actuating mechanism by means of which the control surface is extended from its position at the trailing edge of the main sustaining surface and by which it is concurrently or differentially controlled at the will of the pilot.

It is accordingly a major object of the present invention to provide a control surface which is extensible from its normal position at the trailing edge of the wing, both rearwardly and outwardly away from the longitudinal plane of symmetry of the aircraft. It is a further object to provide such an extensible control surface which is particularly adapted for use with airplanes of the tail-less or flying wing type and in which the surface is controllable in both its normal retracted and extended positions. It is a still further object to provide mechanism for the concurrent extension of a pair of such control surfaces which mechanism is such that these surfaces may be supported for their operation in any position intermediate their retracted and extended positions.

It is also an object of this invention to provide an extensible surface which is capable of use as an aileron for lateral control and as an elevator for longitudinal control. It is a further object to provide actuating mechanism for the differential operation of said surface as an aileron in each of its extended positions and for its simultaneous operation as an elevator. A further object resides in the provision of such a combined aileron-elevator surface which is appreciably extended outwardly from the plane of symmetry of the aircraft to improve its effectiveness as an aileron and which is extended rearwardly from the center of gravity of the airplane to increase the effectiveness of the surface as an elevator. Other objects and advantages of this invention will become apparent to those skilled in the art after reading the present specification together with the drawings forming a part hereof in which:

Fig. 4 is an isometric view of the operating mechanism by which the auxiliary surface is extended and rotated into its operating positions;

Fig. 5 is a similar isometric view of a form of control mechanism by which the pair of auxiliary surfaces is differentially or concurrently actuated; and Fig. 6 is an isometric view of a modified form of the mechanism shown in Fig. 4 but in which the rotation of the auxiliary surface is cable controlled.

Figure 1:
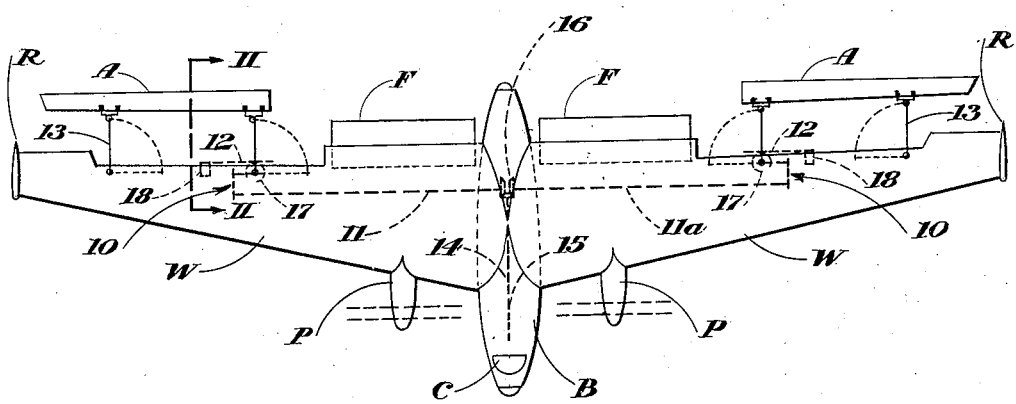
Fig. 1 is a plan view of a tail-less type airplane to which the present invention has been applied.

Referring now to Fig. 1, there is shown a plan view of an airplane of the tail-less type provided with a body or fuselage B, having a control cabin or cockpit C and a main sustaining surface or wing W. While the present invention has been shown and described as particularly adapted for use with tail-less or flying wing types of aircraft, it is pointed out that this invention is not limited to use therewith. The airplane may preferably be provided with power plants P driving tractor propellers, as well as vertical surfaces R at the wing tips for rudder or steeering control, and high lift flaps F for landing and take-off purposes. It will also be understood that the flaps F may extend fully beneath the fuselage as a continuous auxiliary lift member, or the airplane may be of the flying wing type in which there is no fuselage as such, and the pilot control position may be housed entirely within the wing.

The improved control surface of the present invention is indicated in Fig. 1 by the letter A as shown in full lines in its rearwardly and outwardly extended position. Its operating mechanism is indicated generally in dotted lines by the numeral 10, with the mechanism for rocking the surface indicated at 11, and the mechanism for extending the surface indicated as at 12. Both the flap F and the balancing surface A are shown in their rearwardly extended positions in Fig. 1, as well as by the full line portions of these surfaces in the cross-sectional view in Fig. 2. In the latter figure the C. of G., or center of gravity, is indicated with respect to the wing profile W and the broken line Fa extending downwardly and rearwardly therefrom indicates the moment arm of the positive lifting force Ff developed by the extended flap F. Similarly, the rearwardly extending line Aa from the C. of G. toward the balancing surface A represents the moment arm of the negative force Af developed by the balancing surface.

Figure 2:
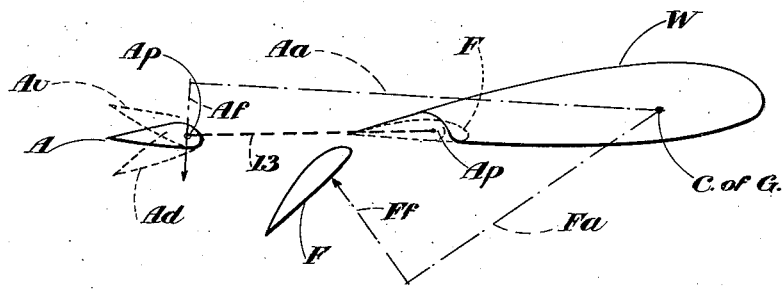
Fig. 2 is a transverse sectional view taken through the wing, the flap and the extended balancing surface along the line II—II of Fig. 1, showing diagrammatically the nature of the forces developed by the flap and the improved balancing surface.
Figure 3:
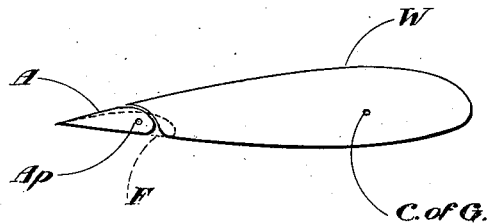
Fig. 3 is a transverse sectional view, similar to Fig. 2, showing the flap and balance surface in their retracted positions.

The flap F is projectable in a well known manner rearwardly and downwardly from the dotted line position in which it is nested within an undersurface recess in the wing W to the extended position shown in full lines in Fig. 2. The balancing surface A is extendable upon a bracket assembly indicated generally by the dotted line 13; in which extended position it is rockable about the axis of its pivot Ap into the upper dotted position Au, and through its neutral or normal position into its lower or downward position Ad. It will accordingly be noted that as the flap F is extended for take-off, landing or other flight condition it develops a positive lifting force or moment about the center of gravity of the aircraft (C. of G.) to cause the same to dive, but that this force can be balanced by a relatively smaller downward or negative lifting force acting through a longer moment arm developed by the control of the balancing surface A. In the neutral retracted positions of the flap F and the auxiliary balance surface A, they both form the trailing portions of the wing W as shown in Fig. 3.

As indicated generally in Fig. 1 the mechanism for rocking the auxiliary balance surface A about its pivot comprises the push-pull and torque shafts 14 and 15, respectively, which extend rearwardly through the fuselage B from the pilot position at C to a conversion unit 16 from which torque shafts 11 extend laterally spanwise of the wing to the actuating mechanism generally indicated at 10 in the region of the vertical pivot 17 of the surface supporting bracket 13. The balance surfaces A are preferably projected into their extended positions by means of a motor 18 controllable from the pilot position at C and operating the swinging brackets 13 through the aforementioned mechanism indicated generally at 12 and to be further described in detail below in connection with Fig. 4.

Referring now to Fig. 4, a rear spar or other spanwise structural element of the wing is indicated at Ws and has fixedly attached to the rear side thereof a pair of brackets 19 which are vertically bored to provide the journal for the bracket pivot 17. It will be understood that the assembly shown in Fig. 4 represents the inboard portion of the surface A as indicated at the left of Fig. 1. Two bracket arms 13 are provided for each balance surface A and a vertical bracket 19 is provided for the support of each bracket arm 13.

Rotary pilot forces transmitted through the torque shaft 11 are transmitted through the sheave or sprocket 20, and the cable or chain 21 to the sprocket 22, which is similarly fixed to the outer end of the shorter torque shaft 23. To the inner end of the latter there is fixed a bevel gear 24 which is continually in mesh with the idler bevel gear 25 fixed to the upper end of the pivot shaft 17. The bevel gear 25 is in mesh with a like bevel gear 26 which is keyed or otherwise fixed to the shaft 27, journalled as at 28 and 29 within the bracket arm 13. The outer end of the shaft 27 has keyed thereon a further bevel gear 30 which engages a like bevel gear 31 fixed to the upper terminal of the outer pivot shaft 32 journalled on a vertical axis within the outer end of the bracket arm 13. The lower end of the shaft 32 has fixed thereto a control arm 33 universally connected at its outer terminal to the push-pull rod 34 which in turn is similarly connected to the control horn 35 of the balance surface A.

It will accordingly be noted that with the balance surface A in its extended full line position of Fig. 4, rotation of the torque shaft 11 will impart rotation in the same direction to the shaft 23 and its gear 24 which will cause to rotate through the idler gear 25 and the gears at each end of the shaft 27, the gear 31 and its attached vertical shaft 32 to cause rocking of the balance surface A about its substantially horizontal pivot axis Ap.

Referring to Fig. 5, the conversion unit 16 comprises essentially a differential gear assembly consisting of a pair of opposed bevel gears 36 and 37 journalled for rotation upon aligned axes and having a beveled pinion 38 interposed therebetween and in continual meshing engagement with each of the larger gears. A housing 39 encloses the three bevel gears referred to and is provided with hubs or journal portions 40 within which the shafts all are adapted to rotate. The housing 39 is also provided with a radially aligned bearing adapted to house the short shaft 41 upon the end of which is fixed the bevel pinion 38. The forward or opposite end of the stub shaft 41 is attached to a universal joint 42, the forward half of which is internally splined to slidingly engage the external splines 33 on the rearward terminal of the torque shaft 15. On the upper portion of the housing 39 there is formed a bracket 44 which by means of a clevis connection 45 is pivotally attached to the rear terminal of the push-pull rod 14.

Accordingly upon rotation of the torque shaft 15 in either direction the bevel pinion 38 will cause the bevel gears 36 and 37 to rotate in opposite directions causing similar opposite rotation of the shaft portions 11 and 11a to thereby cause the mechanism shown in Fig. 4, to provide opposite or differential operation of the auxiliary balance surfaces A for aileron action. If, however, it is desired that each of the balance surfaces A be rocked about their respective horizontal pivot axes in the same direction, either upwardly or downwardly for elevator action, it is only necessary that the pilot prevent rotation of the torque shaft 15 and move the push-pull shaft 14 in the desired fore and aft direction. Longitudinal movement of the shaft 14 causes rocking of the housing 39 about the spanwise axes of the shafts 11 and 11a, but inasmuch as the shaft 15 is prevented from rotating, the bevel pinion 38 serves as a locking gear to cause the differential gears 36 and 37 to rotate together in the same direction with the housing 39 and the shafts 11 and 11a. It will be understood that a further universal joint similar to that shown at 42 would be provided in the forward portion of the torque shaft 15 to permit this shaft to follow the rotary movement of the housing 39, either upwardly or downwardly, and to permit the spline 43 to compensate for the variation in distance between the centers of the respective universal joints.

Referring again to Fig. 4, the mechanism generally designated as 12 for the extension and retraction of the balance surface A will now be described. A motor 18, which may be either of the electric, hydraulic or other type, is provided with a gear housing 18a and a drive shaft 46 to which is keyed a worm 47 in engagement with the worm gear 48. The latter is journalled upon the aforementioned vertical pivot shaft 17 and is fixedly attached to rotate with bracket lever 13 through its bolted connections to the lugs 49 thereof. A double-arm yoke 50 is pivotally mounted and freely rotatable upon the outer vertical pivot shaft 32 for guided horizontal movement about its vertical axis within the slotted portion 51 of the bracket arm 13. It will accordingly be seen that the pair of bracket arms 13 pivotally interconnecting the rear spar Ws of the wing with each pair of yokes 50 forms a parallelogram linkage with its corners defined by the axes of the vertical pivots 17 and 32. Accordingly as the motor 18 is operated by a suitable pilot control its driven worm 47 imparts rotation to the worm gear 48 and outward parallel swinging of the arms 13, the yokes 50 and the attached balance surface A, which is at all times maintained in positions which are parallel to that which it occupies when retracted and nested against the trailing edge of the wing W, while at the same time it is displaced outwardly from the longitudinal plane of symmetry of the airplane. It should also be noted that the surface A is capable of being held and operated in any position intermediate its retracted and extended positions.

It will also be noted that the mechanism for the extension and retraction of the balance surfaces A is independent of the setting or control of the mechanism or the rocking of the surface about its pivot axes Ap journalled within the rearmost portion of the arms of the yoke 50. The control for the motor 18 is, however, preferably interconnected with the control means for the extension and retraction of the flap F in order that both the balance surfaces A and the flaps F be extended and retracted automatically and simultaneously unless such automatic interconnection is deliberately overridden or eliminated by the pilot. It should also be noted that the differential gear mechanism 16 shown in Figure 5 can be operated either for elevator or aileron action of the balance surfaces A regardless of whether the latter surfaces are in their retracted or extended positions. Conversely it will also be apparent that regardless of the position into which these surfaces have been rocked, the extension and retraction mechanism 12 is effective whether selectively controlled by the pilot or automatically actuated by his extension of the flaps F for take-off or landing.

In Figure 6 there is shown a modified form of mechanism for actuating the rocking of the balance surface A wherein cables and sheaves have been substituted for the several bevel gear sets shown in Figure 4. A generally similar bracket arm 52 is pivotally supported for rotation with respect to the bracket 53 supported from the wing structure and carries at its outer recessed portion a yoke 54 supporting the pivotal mounting for the balance surface A. The bracket 53 carries a vertical pivot shaft 55 upon which the arm 52 is adapted to rotate and the latter in turn carries a vertical pivot shaft 56 upon which the yoke 54 is adapted to similarly rotate. It will be understood that suitable mechanism, of which several types are known and available, will be provided to selectively impart movement in either the same or opposite directions to the cables 57, the sheaves 58, and through a continuous cable 59, to the sheaves 60, 61 and 62. These cables are preferably locked to their respective sheaves to insure positive rotation thereof and since the sheave 62 is fixedly attached to the upper terminal of three pivot shafts 56 the desired rotation of control lever 63 is obtained and the locking of the balance surface A is accomplished to the desired extent. The mechanism for projecting the surface A may be similar to that shown in connection with Figure 4.

The improved arrangement and mechanism which has been shown and described herein accordingly provides an advantageous and efficient means for balancing the diving moments which are created, particularly in aircraft of the tailless type, by the extension of the flaps, and the present invention accomplishes these results with mechanisms which are positive acting, of a high strength-to-weight ratio and relatively efficient in their operation and results. Other forms and modifications of the present invention both with respect to the general details of the respective parts are intended to come within the scope and spirit of this invention as more particularly defined in the appended claims.

We claim:

1. In a tail-less airplane a central fuselage, sustaining wings extending laterally from each side of said fuselage, directional control means associated with said sustaining surfaces, high lift flaps associated with the inboard trailing portions of said sustaining surfaces, balance surfaces associated with the trailing portions of said sustaining surfaces outboard of said flaps, means to simultaneously extend said high lift flaps and said balance surfaces into their operating positions rearwardly of said sustaining surfaces and control means for selectively adjusting the angle of attack of said balance surfaces in both their retracted and extended positions.

2. In an aircraft control system, means for extending and supporting a control surface comprising a main wing, a laterally extending rear structural member carried by said wing, laterally spaced pivot supports carried by said structural member, laterally spaced parallel arms pivotally carried upon said pivot supports, a yoke pivotally mounted upon the outer end of each said arm having pivotal supports to which said surface is horizontally pivoted, means to rotate said arms for the simultaneous rearward and laterally outward extension of said control surface and means to rotate said control surface in both its retracted and extended positions.

3. In a control surface operating assembly, a main sustaining surface, a control surface disposed adjacent the trailing edge thereof, pivotal supports carried by said main sustaining surface, a pair of arms pivotally mounted upon vertical axes upon said pivotal supports for swinging in substantially horizontal paths, a vertically disposed pivot carried at the free end of each of said arms, a yoke pivotally carried upon said vertical arm end pivots for rotation in a horizontal path and having a horizontal pivotal connection at its outer terminals for the pivotal support of said control surface, means to rotate said arms from aligned spanwise positions adjacent said sustaining surface trailing edge, and control means including rotatable transmission elements co-axially mounted upon said vertical pivot axes to rock said control surface in its retracted and extended position.

HARRY A. SUTTON.
ROLF EVERS.

REFERENCES CITED

The following references are of record in the file of this patent:

UNITED STATES PATENTS

| Number | Name | Date |
|---|---|---|
| 1,051,429 | Merck | Jan. 28, 1913 |
| 1,274,986 | Carolin | Aug. 6, 1918 |
| 1,889,295 | Rosatelli | Nov. 29, 1932 |
| 1,987,050 | Burnelli | Jan. 8, 1935 |
| 2,130,958 | Kramer | Sept. 20, 1938 |
| 2,156,994 | Lachmann | May 2, 1939 |
| 2,172,289 | Munk | Sept. 2, 1939 |
| 2,207,453 | Blume | July 9, 1940 |
| 2,210,642 | Thompson | Aug. 6, 1940 |
| 2,218,114 | Kunze | Oct. 15, 1940 |
| 2,218,822 | Joyce | Oct. 22, 1940 |
| 2,236,838 | Robert | Apr. 1, 1941 |
| 2,243,885 | Schweisch | June 3, 1941 |
| 2,246,116 | Wagner et al. | June 17, 1941 |
| 2,252,656 | Youngman | Aug. 12, 1941 |
| 2,313,768 | Putt | Mar. 16, 1943 |
| 2,397,526 | Bonbright | Apr. 2, 1946 |

OTHER REFERENCES

"Aircraft Engineering," February 1945, pages 41–45.